US011995942B2

(12) United States Patent
Xu et al.

(10) Patent No.: US 11,995,942 B2
(45) Date of Patent: May 28, 2024

(54) VENDING MACHINE

(71) Applicants: WEIHAI NEW BEIYANG DIGITAL TECHNOLOGY CO., LTD., Shandong (CN); SHANDONG NEW BEIYANG INFORMATION TECHNOLOGY CO., LTD., Shandong (CN)

(72) Inventors: Jiabo Xu, Shandong (CN); Chong Zhou, Shandong (CN); Qiangzi Cong, Shandong (CN); Tianxin Jiang, Shandong (CN); Chuntao Wang, Shandong (CN)

(73) Assignees: WEIHAI NEW BEIYANG DIGITAL TECHNOLOGY CO., LTD, Shandong (CN); SHANDONG NEW BEIYANG INFORMATION TECHNOLOGY CO., LTD., Shandong (CN)

( * ) Notice: Subject to any disclaimer, the term of this patent is extended or adjusted under 35 U.S.C. 154(b) by 771 days.

(21) Appl. No.: 17/261,667

(22) PCT Filed: Jul. 26, 2019

(86) PCT No.: PCT/CN2019/097882
§ 371 (c)(1),
(2) Date: Jan. 20, 2021

(87) PCT Pub. No.: WO2020/020338
PCT Pub. Date: Jan. 30, 2020

(65) Prior Publication Data

US 2021/0272411 A1 Sep. 2, 2021

(30) Foreign Application Priority Data

Jul. 27, 2018 (CN) ........................ 201810843702.4

(51) Int. Cl.
*G07F 11/16* (2006.01)
*G07F 9/00* (2006.01)
*G07F 11/00* (2006.01)

(52) U.S. Cl.
CPC .......... *G07F 11/1653* (2020.05); *G07F 9/006* (2013.01); *G07F 11/007* (2013.01); *G07F 11/16* (2013.01); *G07F 11/163* (2020.05)

(58) Field of Classification Search
CPC ........ G07F 9/006; G07F 11/007; G07F 11/16; G07F 11/163; G07F 11/1653
See application file for complete search history.

(56) References Cited

U.S. PATENT DOCUMENTS 6,808,082 B2 * 10/2004 Ohkubo .................. G07F 11/58 221/133
2005/0189364 A1 * 9/2005 Herzog ............... G07F 11/1653 221/1

(Continued)

FOREIGN PATENT DOCUMENTS

CN 101576707 11/2009
CN 107016786 A 8/2017

(Continued)

OTHER PUBLICATIONS

Chinese Office Action issued Mar. 17, 2021; Chinese Application No. 201810843702.4.

(Continued)

*Primary Examiner* — Gene O Crawford
*Assistant Examiner* — Kelvin L Randall, Jr.
(74) *Attorney, Agent, or Firm* — McDonald Hopkins LLC

(57) ABSTRACT

This application relates to the technical field of automatic vending, and provides a vending machine that includes a control device, a measuring device, a bucket, a bucket driving mechanism configured for driving the bucket into (Continued)

motion, and a storage column configured to store items. The control device controls the measuring device to measure a first distance and a second distance, calculates a difference between the first distance and the second distance, and calculates a number of items in the storage column based on the difference.

10 Claims, 4 Drawing Sheets

(56) References Cited

U.S. PATENT DOCUMENTS

| | | | | |
|---|---|---|---|---|
| 2005/0189370 | A1* | 9/2005 | Carter | G07F 11/32<br>221/210 |
| 2006/0261080 | A1* | 11/2006 | Matsumoto | G07F 11/58<br>221/124 |
| 2006/0273104 | A1* | 12/2006 | Zychinski | G07F 11/38<br>221/123 |
| 2008/0061070 | A1 | 3/2008 | Carter et al. | |
| 2008/0290108 | A1* | 11/2008 | Tsunoda | G07F 11/42<br>221/133 |
| 2020/0043273 | A1* | 2/2020 | Vazquez | G07F 11/165 |
| 2020/0334940 | A1* | 10/2020 | Liu | G07F 11/42 |
| 2021/0158646 | A1* | 5/2021 | Chang | G07F 11/38 |

FOREIGN PATENT DOCUMENTS

| | | | |
|---|---|---|---|
| CN | 206451288 | U | 8/2017 |
| CN | 206574170 | U | 10/2017 |
| CN | 107730732 | A | 2/2018 |
| CN | 207115567 | U | 3/2018 |
| CN | 207123895 | U | 3/2018 |
| CN | 207264495 | U | 4/2018 |
| CN | 107978073 | A | 5/2018 |
| JP | 3174281 | B2 | 6/2001 |
| KR | 101797656 | B1 | 11/2017 |

OTHER PUBLICATIONS

Chinese Office Action issued Sep. 6, 2021; Chinese Application No. 201810843702.4.

English Translation of International Search Report mailed Oct. 12, 2019; International Patent Application No. PCT/CN2019/097882 filed on Jul. 26, 2019.

* cited by examiner

VENDING MACHINE

CROSS-REFERENCE TO RELATED APPLICATIONS

The present application is a United States national stage application of co-pending International Patent Application Number PCT/CN2019/097882, filed on Jul. 26, 2019, which claims priority to Chinese patent application No. 201810843702.4 filed Jul. 27, 2018 with the CNIPA, the disclosures of which are incorporated herein by reference in their entireties.

TECHNICAL FIELD

The present application relates to the technical field of vending, and for example, to a vending machine.

BACKGROUND

A vending machine is a type of commercial automated equipment for selling goods in an automatic manner. Vending machines have been increasingly used because they are not limited by time and location, save manpower, and provide ease of transactions.

There is provided a vending machine in the related art, which includes a cabinet body and a control device. An item outlet is provided in a surface of the cabinet body, and storage columns, a bucket and a distance measurement sensor are disposed inside the cabinet body. The storage columns are used to accommodate items for sale. Each storage column includes a pushing plate used to push an item to the outside of the storage column from an outlet of the storage column. The bucket is disposed between the storage column and the item outlet, and is used to deliver the item between the storage column and the item outlet. The distance measurement sensor is disposed on the bucket, and when the bucket moves to a position corresponding to the storage column, the distance measurement sensor will be located at the outlet of the storage column and opposite to the pushing plate inside the storage column so as to measure a distance between the pushing plate and the outlet of the storage column. The control device calculates the number of items in the storage column based on the distance between the pushing plate and the outlet of the storage column that is measured by the distance measurement sensor as well as a prestored length of an item.

While the vending machine in the related art may be able to automatically detect the number of items in the storage column, applicant has found that it may not be able to accurately detect the number of items in the storage column, resulting in abnormal sales of items, or making it adverse to perform an accurate replenishment or the like for the vending machine.

SUMMARY

The following is a summary of the subject matter described herein in detail. This summary is not intended to limit the scope of the claims.

The present application provides a vending machine so as to avoid the problem of inaccurate detection of the number of items in the storage column that is present with the vending machine of the related art.

Embodiments of the present application include the following. There is provided a vending machine that includes a control device, a bucket, a bucket driving mechanism configured for driving the bucket into motion, and a storage column configured to store items. The storage column includes a pushing plate and a pushing plate driving mechanism, and the pushing plate driving mechanism is configured to drive the pushing plate to move on an item conveying path of the storage column so as to push an item placed in the storage column out of the storage column from an outlet of the storage column in an item dispensing direction. The vending machine further includes a measuring device that is disposed on the bucket and that is configured to measure a distance between a target obstacle on the item conveying path and the bucket and a distance between the pushing plate and the bucket, where the target obstacle is an obstacle nearest to the bucket on the item conveying path. The bucket driving mechanism, the pushing plate driving mechanism and the measuring device are each electrically connected to the control device. The control device is configured to control the measuring device to measure the distance between the pushing plate and the bucket in the item dispensing direction as a first distance and control the measuring device to measure the distance between the target obstacle and the bucket in the item dispensing direction as a second distance, calculate a difference between the first distance and the second distance, and calculate a number of items in the storage column based on the difference.

In one embodiment, the measuring device includes a first distance measurement sensor and a second distance measurement sensor. The control device is configured to control the bucket to move to a first position corresponding to the storage column and control the first distance measurement sensor to measure the first distance and the second distance measurement sensor to measure the second distance. When the bucket is located at the first position corresponding to the storage column, the first distance measurement sensor cooperates with a first detection member of the pushing plate in the storage column, the second distance measurement sensor cooperates with the target obstacle in the storage column, and the first detection member of the pushing plate is disposed outside the item conveying path.

In one embodiment, the measuring device includes a third distance measurement sensor. The control device is configured to control the bucket to move to a second position corresponding to the storage column, control the third distance measurement sensor to measure the first distance, control the bucket to move to a third position corresponding to the storage column, and control the third distance measurement sensor to measure the second distance. When the bucket is located at the second position corresponding to the storage column, the third distance measurement sensor cooperates with a first detection member of the pushing plate in the storage column, and the first detection member of the pushing plate is disposed outside the item conveying path. When the bucket is located at the third position corresponding to the storage column, the third distance measurement sensor cooperates with the target obstacle.

In one embodiment, the pushing plate is provided with a second detection member, the second detection member is disposed on the item conveying path, and in a case of no item in the storage column, the target obstacle is the second detection member.

In one embodiment, the second detection member is disposed at a lower end of the pushing plate.

In one embodiment, the storage column includes a support plate configured for supporting the items and partition plates oppositely disposed on two sides of the support plate, the partition plates and the support plate jointly defining an item accommodation space of the storage column, and the first detection member is disposed above the partition plates or at an upper end of the pushing plate.

In one embodiment, the control device is further configured to control the pushing plate of the storage column to push an item to be purchased by a user to the bucket after the operation of controlling the bucket to move to the first position corresponding to the storage column and before the operation of controlling the second distance measurement sensor to measure the second distance.

In one embodiment, the control device is further configured to control the pushing plate of the storage column to push an item to be purchased by a user to the bucket after the operation of controlling the bucket to move to the second position corresponding to the storage column and before the operation of controlling the bucket to move to the third position corresponding to the storage column.

In one embodiment, the vending machine further includes a human-computer interaction device electrically connected to the control device, and the human-computer interaction device is configured to receive an item purchase order of a user.

In one embodiment, the control device is further configured to determine whether the difference between the first distance and the second distance is less than a first threshold, and determine that the items in the storage column have been sold out in response to determining that the difference between the first distance and the second distance is less than the first threshold.

In one embodiment, the control device is further configured to determine whether the number of items in the storage column is less than a second threshold, and determine that the items in the storage column are about to be sold out in response to determining that the number of items in the storage column is less than the second threshold.

In one embodiment, the vending machine is applied to a vending system. The vending system includes a server and a plurality of vending machines communicatively coupled to the server. The vending machine further includes a communication device electrically connected to the control device and configured to transmit a notification message to the server specifying that the items have been and/or are about to be sold out.

Other aspects can be understood after the drawings and the detailed description are read and understood.

BRIEF DESCRIPTION OF DRAWINGS

To illustrate technical solutions in embodiments of the present application more clearly, the accompanying drawings used in the embodiments will be briefly described below. It is to be understood that the subsequent drawings illustrate only certain embodiments of the present application, and therefore should not be construed as limiting the scope. Those of ordinary skill in the art may obtain other related drawings based on the accompanying drawings described below on the premise that no creative work is done.

REFERENCE SIGNS

Figure 1:
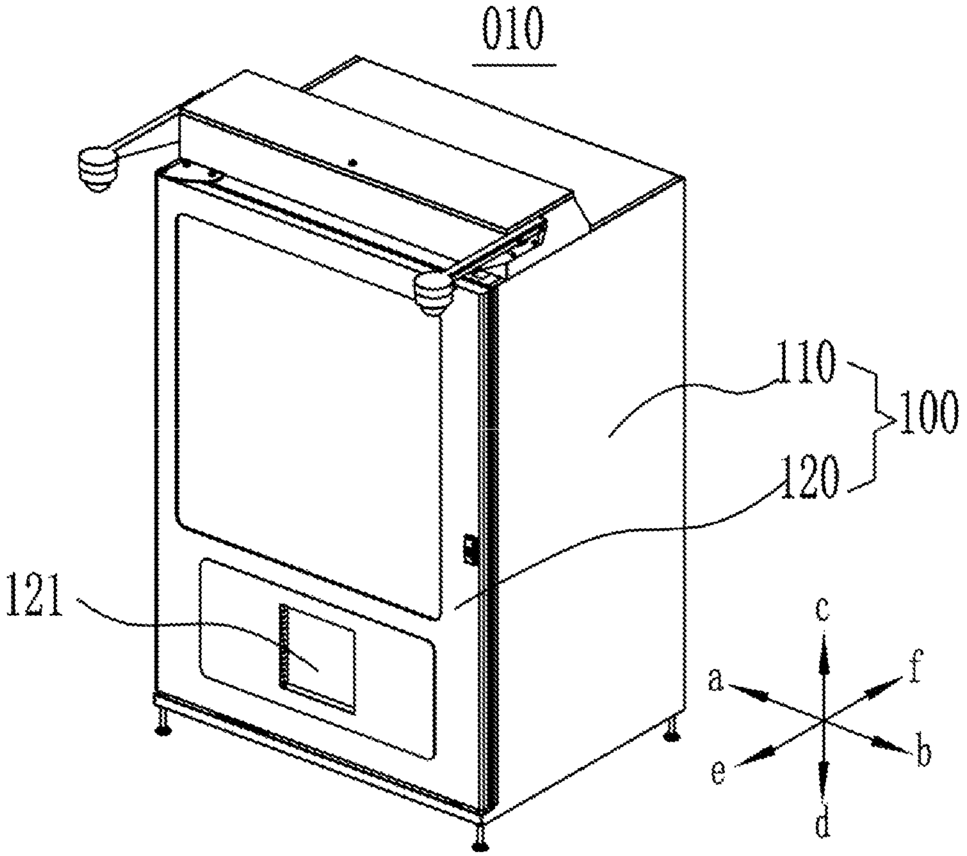
FIG. 1 is a schematic diagram illustrating the exterior of a vending machine according to an embodiment of the present application.

| | |
|---|---|
| 010. vending machine | 100. cabinet |
| 110. cabinet body | 120. cabinet door |
| 121. item outlet | 200. item storage device |
| 210. storage column | 211. pushing plate |
| 211a. first detection member | 211b. second detection member |
| 212. support plate | 213. partition plate |
| 214. pushing plate driving mechanism | 300. delivery device |
| 310. bucket | 320. bucket driving mechanism |
| 321. horizontal driving mechanism | 322. vertical driving mechanism |
| 400. measuring device | 410. distance measurement sensor |
| 410a. first distance measurement sensor | 410b. second distance measurement sensor |
| 500. memory | 600. human-computer interaction device |
| 700. communication device | 800. control device |
| 900. first position | |

DETAILED DESCRIPTION

The technical solutions in the embodiments of the present application will be described in a definite and comprehensive manner in conjunction with the drawings in the embodiments of the present application. Apparently; the embodiments described below are part, not all, of the embodiments of the present application. Generally, the components of this embodiment of the present application described and illustrated in the drawings herein may be arranged and designed through various configurations. Therefore, the following detailed description of the embodiments of the present application and shown in the drawings is not intended to limit the scope of the present application, but merely illustrates some selected embodiments of the present application. Based on the embodiments of the present application, all other embodiments obtained by those of ordinary skill in the art without investing creative efforts shall all fall in the scope of the present disclosure.

It is to be noted that similar reference numerals and letters indicate similar items in the subsequent drawings, and therefore, once a particular item is defined in a drawing, the item needs no more definition and explanation in subsequent drawings. In the description of the embodiments of the present application, it is to be noted that the orientational or positional relationships indicated by terms "center", "above", "below", "left", "right", "vertical", "horizontal", "inside", "outside" and the like are based on the orientational or positional relationships illustrated in the drawings or the orientational or positional relationship that products of the present application are usually used, the terms are for the mere purpose of facilitating and simplifying the description of the present application and do not indicate or imply that the device or element referred to has a specific orientation and is constructed and operated in a specific orientation, and thus it is not to be construed as limiting the present application. Moreover, terms "first", "second" and "third" are merely for distinguishing the description and are not to be construed as indicating or implying relative importance.

The applicant has found that when the vending machine of the related art sells goods, after a maintenance person replenishes the vending machine or after an item to be purchased by a user is pushed out of a storage column from an outlet of the storage column, the distance between a front surface (that is, a surface of the item facing toward the outlet of the storage column) of the item located at a head end of the storage column (that is, the item nearest to the outlet of the storage column) and the outlet of the storage column may not be zero, and the distance is uncertain. In this case, if the number of items in the storage column is calculated based on the distance between a pushing plate and the outlet of the storage column measured by a distance measurement sensor disposed on a bucket, the calculated number of items may not coincide with the actual number of items in the storage column, that is, the detected number of items in the storage column may be inaccurate. Therefore, the applicant proposes the following technical solutions.

Technical solutions of the present application are further described below in connection with some illustrative embodiments and the drawings.

Figure 2:
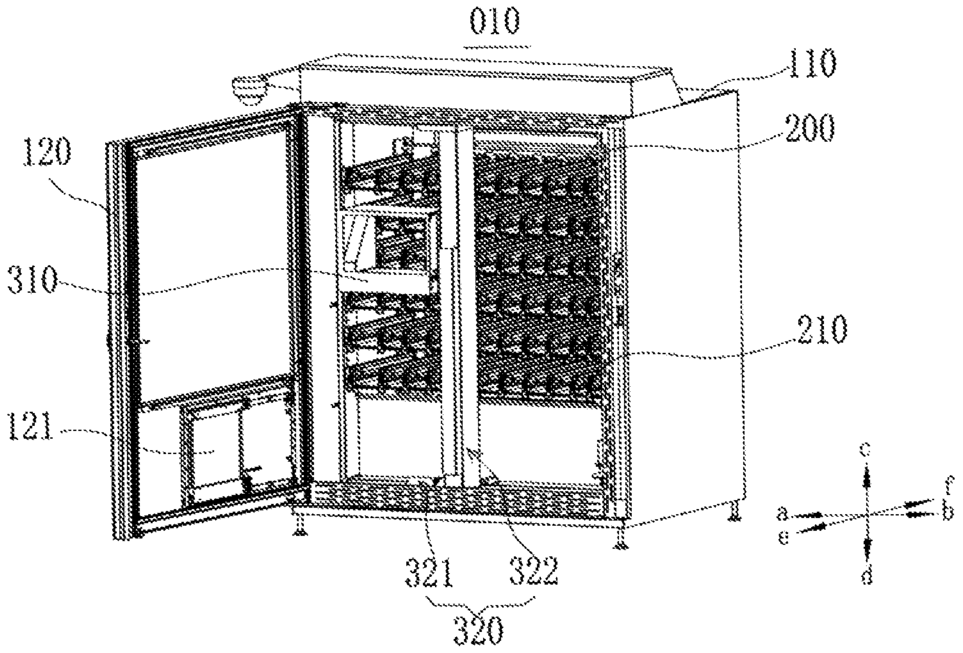
FIG. 2 is a schematic diagram illustrating the interior of a vending machine according to an embodiment of the present application.
Figure 3:
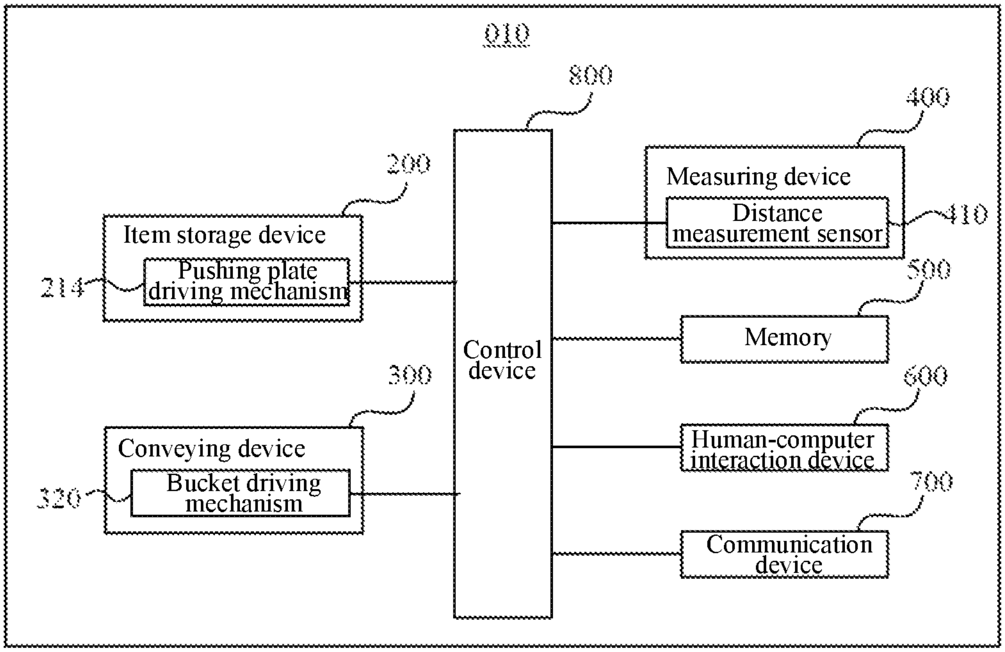
FIG. 3 is a block diagram of a vending machine according to an embodiment of the present application.

FIG. 1 and FIG. 2 are schematic diagrams of a vending machine 010 according to an embodiment of the present application. FIG. 3 is a block diagram of a vending machine 010 according to an embodiment of the present application. The vending machine of the embodiment of the present application is described below with reference to FIG. 1 to FIG. 3.

As illustrated in FIG. 1 to FIG. 3, the vending machine 010 of this embodiment includes a cabinet 100, an item storage device 200, a delivery device 300, a measuring device 400, a memory 500, a human-computer interaction device 600, a communication device 700, and a control device 800.

As illustrated in FIG. 1, the cabinet 100 includes a cabinet body 110 and a cabinet door 120, the cabinet door 120 is movably connected to the cabinet body 110, the cabinet body 110 includes an opening (not shown in the figure), and the cabinet door 120 can move relative to the opening of the cabinet body 110 so as to open or close the cabinet body 110. The cabinet door 120 is provided with an item outlet 121 for a user to take out the item.

The item storage device 200 is configured to accommodate items for sale. As illustrated in FIG. 2, the item storage device 200 is disposed inside the cabinet body 110, the item storage device 200 is disposed opposite to and spaced apart from the cabinet door 120, the item storage device 200 includes a plurality of storage columns 210 for accommodating items, the plurality of storage columns 210 are arranged in M layers in an up-down orientation (that is, a direction indicated by arrows c and d) and in N columns in a left-right orientation (that is, a direction indicated by arrows a and b), and a length direction of the storage columns 210 extends in a front-rear orientation (that is, a direction indicated by arrows e and f). The items are sequentially arranged along the length direction of the storage column 210 when stored in the storage column 210. An end of the storage column 210 facing towards the cabinet door 120 is provided with an outlet, and the outlet of the storage column 210 faces the cabinet door 120, so the items accommodated in the storage column 210 can be conveyed to the outside of the storage column 210 from the outlet of the storage column 210. It could be understood that in other embodiments of the present application, the vending machine may include only one storage column for storing one type of items.

Figure 4:
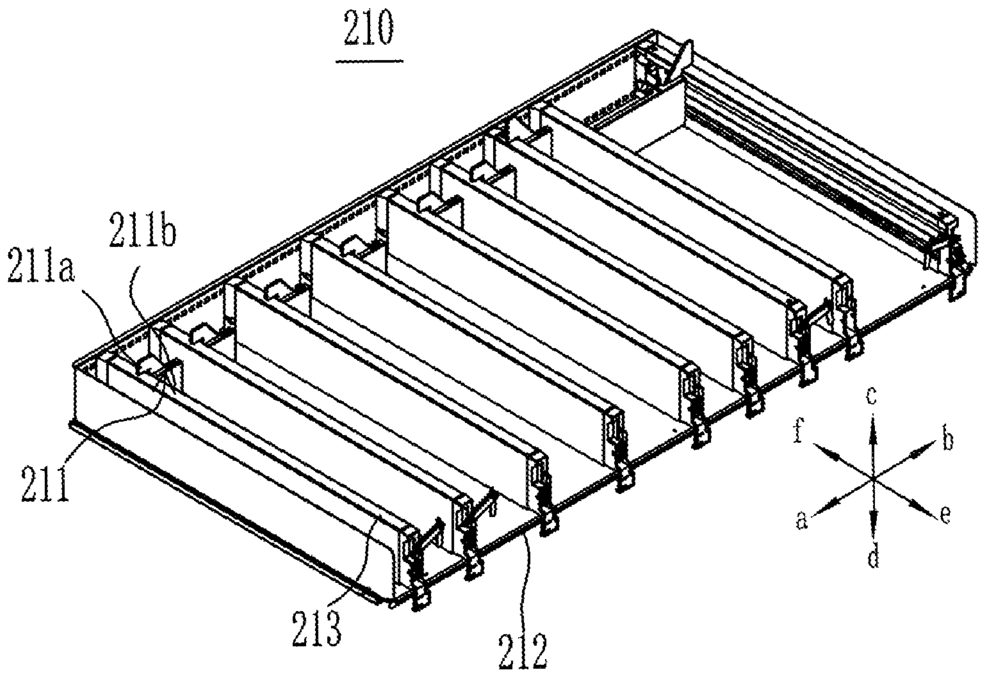
FIG. 4 is a schematic diagram illustrating the structure of a storage column of a vending machine according to an embodiment of the present application.

FIG. 4 is a schematic diagram of a storage column 210 of a vending machine 010 according to an embodiment of the present application. As illustrated in FIG. 4, the storage column 210) includes a pushing plate 211, a support plate 212, and a plurality of partition plates 213 disposed at intervals and above the support plate 212 in left-right orientation. An item accommodation space for accommodating an item is defined between the support plate 212 and adjacent two partition plates 213, the pushing plate 211 is disposed in the storage column 210, and a part of the pushing plate 211 is located in the item accommodation space. The storage column 210 further includes a pushing plate driving mechanism 214, and the pushing plate driving mechanism 214 is connected to the pushing plate 211 in a transmission mode. Under the drive of the pushing plate driving mechanism 214, the pushing plate 211 can move along the length direction of the storage column 210, thereby pushing the items in the storage column 210 to move in the storage column 210 along an item conveying path such that the item for sale are pushed to the outside of the storage column 210 from the outlet of the storage column 210.

The delivery device 300 is configured to deliver the items between the item storage device 200 and the item outlet 121. The delivery device 300 is disposed between the cabinet door 120 and the item storage device 200. As illustrated in FIG. 2, the delivery device 300 includes a bucket 310 and a bucket driving mechanism 320, one end of the bucket 310 facing towards the cabinet door 120 is provided with an outlet, and one end of the bucket 310 facing towards the storage column 210 is provided with an inlet. The bucket driving mechanism 320 includes a horizontal driving mechanism 321 and a vertical driving mechanism 322, the horizontal driving mechanism 321 includes a horizontal holder (not shown in the figure) and a first power assembly (not shown in the figure), and the vertical driving mechanism 322 includes a vertical holder (not shown in the figure) and a second power assembly (not shown in the figure). The bucket 310 is connected to the vertical holder in the transmission mode, and the second power assembly is disposed between the bucket 310 and the vertical holder so as to drive the bucket 310 to move in the up-down orientation on the vertical holder. The vertical holder is connected to the horizontal holder in the transmission mode, and the first power assembly is disposed between the vertical holder and the horizontal holder so as to drive the vertical holder to carry the bucket 310 to move in the left-right orientation on the horizontal holder. In this way, the bucket driving mechanism 320 can drive the bucket 310 to move in the up-down orientation, or drive the bucket 310 to move in the left-right orientation, or drive the bucket 310 to move in both the up-down orientation and the left-right orientation such that the inlet of the bucket 310 is opposite to the outlet of any one of the buckets 210, or the outlet of the bucket 310 is opposite to the item outlet 121. When the inlet of the bucket 310 is opposite to the outlet of one storage column 210, the items in the storage column 210) can be pushed out from the outlet of the storage column 210 and into the interior of the bucket 310 through the inlet of the bucket 310. When the outlet of the bucket 310 is opposite to the item outlet 121, the user can take out the items in the bucket 310 through the item outlet 121.

The measuring device 400 is configured to measure a distance between the pushing plate 211 of the storage column 210 and the bucket 310 and a distance between a target obstacle on the item conveying path and the bucket 310. The target obstacle is an obstacle nearest to the bucket 310 on the item conveying path. It could be understood that in a case of there is an item in the storage column 210, the target obstacle is first item, and the first item are items nearest to the outlet of the storage column 210 in the storage column 210. In a case of there is an item in the storage column 210, the distance between the target obstacle to the bucket 310 refers to a distance between a front surface (that is, a surface facing towards the bucket 310) of the first item and the bucket 310. In a case of no item in the storage column 210, the target obstacle is the pushing plate 211. The measuring device 400 includes at least one distance measurement sensor 410, and the distance measurement sensor 410 is disposed on the bucket 310 and can move with the bucket 310.

As illustrated in FIG. 4, in one embodiment of the present application, the pushing plate 211 of each storage column 210 includes a first detection member 211*a* and a second detection member 211*b*. The first detection member 211*a* and the second detection member 211*b* have the same position along the length direction (that is, the front-rear orientation) of the storage column 210, the first detection member 211*a* is disposed at a first preset position of the pushing plate 211, and the second detection member 211*b* is disposed at a second preset position of the pushing plate 211. The first preset position of the pushing plate 211 is disposed outside the item conveying path, and the second preset position of the pushing plate 211 is located inside the item accommodation space of the storage column 210 and on the item conveying path, that is, the first detection member 211*a* is disposed outside the item conveying path, and the second detection member 211*b* is located on the item conveying path. The item conveying path may be understood as a space swept by the items when transported along the length direction of the storage column 210 and the extension of the said space along the length direction of the storage column 210. The first detection member 211*a* is disposed outside the item conveying path, that is to say, the first detection member 211*a* is not located within the space swept by the items when transported along the length direction of the storage column 210 and a range of the extension of the said space along the length direction of the storage column 210. The second detection member 211*b* is located on the item conveying path, that is to say, the second detection member 211*b* is located within the space swept by the items when transported along the length direction of the storage column 210 and the range of the extension of the said space along the length direction of the storage column 210. In a case where the bucket 310 is located at a position corresponding to one storage column 210, the distance measurement sensor 410 is located at the outlet of the storage column 210, and since the first preset position is locate outside the item conveying path, a mounting position of the first detection member 211*a* satisfies a condition described below: Whether the items are available in the storage column 210, the bucket 310 can be driven to a preset position such that the space between the first detection member 211*a* and the distance measurement sensor 410 along the length direction of the storage column 210 will not be blocked by the item in the storage column 210, that is, the distance measurement sensor 410 can cooperate with the first detection 211*a* regardless of whether the items are available in the storage column 210, and thus the distance between the first detection member 211*a* and the bucket 310, that is, the distance between the pushing plate 211 and the bucket 310 can be measured. Since the second preset position of the pushing plate 211 is located in the interior of the item accommodation space of the storage column 210 and located on the item conveying path, a mounting position of the second detection member 211*b* satisfies a condition described below: In a case of no item in the storage column 210, the bucket 310 can be driven to a preset position such that the space between the second detection member 211*b* and the distance measurement sensor 410 along the length direction of the storage column 210 will not be blocked by the item in the storage column 210, the distance measurement sensor 410) can cooperate with the second detection 211*b*, and thus the distance between the second detection member 211*b* and the bucket 310, that is, the distance between the pushing plate 211 and the bucket 310 can be measured. In a case of there is an item in the storage column 210, no matter where the bucket 310 is located, the space between the second detection member 211*b* and the distance measurement sensor 410 will be blocked by the item in the storage column 210, the distance measurement sensor 410 cannot cooperate with the second detection member 211*b*, but the bucket 310 can be driven to a preset position such that the distance measurement sensor 410 cooperates with the first item in the storage column 210, and thus the distance between the first item and the bucket 310 can be measured. Therefore, it is also may be understood that when the items are arranged along the length direction of the storage column 210, a projection of the items on the pushing plate 211 along the length direction of the storage column 210 covers the second preset position. As illustrated in FIG. 4, in this embodiment, the first preset position is located at an upper left portion of the pushing plate 211 and above the partition plate 213 of the storage column 210, and the second preset position is located at a lower end of the pushing plate 211 and is located in a middle portion of the storage column 210 in the left-right orientation. In other embodiments provided by the present application, the first preset position may further be disposed at an upper end of the pushing plate 211, and the height of the pushing plate 211 is set to be greater than the height of the highest items sold by the vending machine 010 such that the space between the first detection member 211*a* and the bucket 310 will not be blocked by the item in the storage column 210.

It is to be noted that the distance measurement sensor 410 included in the measuring device 400 can measure the distance between the pushing plate 211 and the bucket 310 and the distance between the target obstacle and the bucket 310, and the present application does not limit the number of distance measurement sensors 410 included in the measuring device 400. For example, in one embodiment of the present application, the measuring device 400 may include a first distance measurement sensor and a second distance measurement sensor, and the first distance measurement sensor and the second distance measurement sensor have the same position along the length direction (that is, the front-rear orientation) of the bucket 310. The bucket 310 is controlled to be located at a first position 900 corresponding to one storage column 210 such that the position of the first distance measurement sensor corresponds to the first preset position of the pushing plate 211 in the storage column 210, so that the first distance measurement sensor can measure the distance between the first detection member 211*a* and the bucket 310. The position of the second distance measurement sensor corresponds to the second preset position of the pushing plate 211 in the storage column 210 such that the second distance measurement sensor can measure the distance between the second detection member 211*b* and the bucket 310 when there is no item in the storage column 210 and measure the distance between the first item in the storage column 210 and the bucket 310 when there is an item in the storage column 210. In another embodiment of the present application, the measuring device 400 includes a third distance measurement sensor. The bucket 310 is controlled to be located at a second position corresponding to one storage column 210 such that the position of the third distance measurement sensor corresponds to the first preset position of the pushing plate 211 in the storage column 210, that is, the third distance measurement sensor cooperates with the first detection member 211*a* of the pushing plate 211 in the storage column 210 such that the distance between the first detection member 211*a* and the bucket 310 can be measured. The bucket 310) is controlled to be located at a third position corresponding to the storage column 210 such that the position of the third distance measurement sensor corresponds to the second preset position of the pushing plate 211 in the storage column 210, that is, the third distance measurement sensor cooperates with the target obstacle so as to measure the distance between the target obstacle and the bucket 310, that is, the third distance measurement sensor measures the distance between the second detection member 211*b* and the bucket 310 when there is no item in the storage column 210 and measures the distance between the first item in the storage column 210 and the bucket 310 when there is an item in the storage column 210. In one or more embodiments, by configuring the measuring device 400 to include only one distance measurement sensor 410, the manufacturing cost of the vending machine 010 is reduced. In one embodiment of the present application, the third distance measurement sensor of the measuring device 400 may also be movably disposed on the bucket 310, and after the bucket 310 is moved to a position corresponding to one storage column 210, the distance between the first detection member 211*a* and the bucket 310 and the distance between the target obstacle and the bucket 310 can be measured by driving the third distance measurement sensor to different positions without moving the bucket 310.

The memory 500 is configured to store control programs of the vending machine 010 and data and variables generated during program operation. For example, the memory 500 is configured to store a unit length of the items in each storage column 210, where the length of the item is a distance between opposite two surfaces of the items along the length direction of the storage column 210 when the items are placed in the storage column 210, and the memory 500 is further configured to store a first threshold and a second threshold. The first threshold is used to determine whether the items in the storage column 210 are sold out, and the second threshold is used to determine whether the items in the storage column 210 are about to be sold out.

The human-computer interaction device 600 is configured to perform information interaction between the user and the vending machine 010. For example, the human-computer interaction device 600 receives an item purchase instruction input by the user. For example, the human-computer interaction device 600 outputs a notification message that the items in the storage column 210 are sold out or are about to be sold out to the user.

The communication device 700 is configured to perform data transmission between the vending machine 010 and a server, or to perform data transmission between the vending machine 010 and the a handheld terminal of the user. For example, the communication device 700 is used to receive the item purchase instruction transmitted by the user through the handheld terminal. For example, the communication device 700 is used to transmit a notification message that the items in the storage column 210 are sold out or are about to be sold out to the server.

The control device 800 is electrically connected to the item storage device 200, the delivery device 300, the measuring device 400, the memory 500, the human-computer interaction device 600, and the communication device 700. The control device 800 is configured to control each device electrically connected to the control device to work.

For example, the control device 800 is configured to acquire the item purchase instruction of the user, determine, according to the item purchase instruction of the user, a storage column 210) accommodating an item to be purchased by the user, control the bucket driving mechanism 320 of the delivery device 300 to drive the bucket 310 to the storage column 210, control the pushing plate 211 of the storage column 210 to push the item to be purchased by the user into the bucket 310 from the outlet of the storage column 210, and control the bucket driving mechanism 320) to drive the bucket 310 to the item outlet 121 such that the user can take out the items in the bucket 310. The control device 800 is further configured to detect the number of items in the storage column 210.

In one embodiment, the control device 800 is configured to control the measuring device 400 to measure the distance between the pushing plate 211 and the bucket 310 in the item dispensing direction (that is, the length direction of the storage column 210) as a first distance and control the measuring device 400 to measure the distance between the target obstacle and the bucket 310 in the item dispensing direction as a second distance, calculate a difference between the first distance and the second distance, and calculate the number of items in the storage column 210 based on the difference.

In the embodiment of the present application, the measuring device 400 is configured to measure the distance between the pushing plate 211 of the storage column 210 and the bucket 310 and the distance between the first item and the bucket 310. The first item is the item nearest to the outlet of the storage column 210 in the storage column 210, and the distance between the first item and the bucket 310 refers to the distance between a front surface of the first item and the bucket 310. The measuring device 400 includes at least one distance measurement sensor 410, and the distance measurement sensor 410 is disposed on the bucket 310 and is operative to move with the bucket 310. The bucket 310 is controlled to move such that the distance measurement sensor 410 moves to a position opposite to the first detection member 211*a* of the pushing plate 211, such that the first distance is detected. The bucket 310 is controlled to move such that the distance measurement sensor 410 is moved to a position opposite to the second detection member 211*b* of the pushing plate 211, such that the second distance is detected. The control device 800 can calculate the number of items in the storage column 210 based on the difference between the first distance and the second distance and the pre-stored unit length of the items.

In the embodiment that the measuring device 400 includes the first distance measurement sensor and the second distance measurement sensor, the control device 800 is configured to control the bucket 310 to move to the first position 900 corresponding to the storage column 210, and control the first distance measurement sensor to measure the first distance and the second distance measurement sensor to measure the second distance. When the bucket 310 is located at the first position 900 corresponding to the storage column 210, the first distance measurement sensor cooperates with the first detection member 211*a* of the pushing plate 211 in the storage column 210, and the second distance measurement sensor cooperates with the target obstacle in the storage column 210. As described above, the first detection member 211*a* of the pushing plate 211 is disposed outside the item conveying path.

In this embodiment, when the bucket 310 is located at the first position 900 corresponding to the storage column 210, the position of the first distance measurement sensor corresponds to the first preset position of the pushing plate 211 in the storage column 210, the first preset position of the pushing plate 211 is disposed outside the item conveying path of the storage column 210, and the first detection member 211*a* is located at the first preset position. Therefore, whether the items are available in the storage column 210, the space between the first detection member 211*a* and the first distance measurement sensor will not be blocked by the item in the storage column 210, that is, regardless of whether the items are available in the storage column 210, the first distance measurement sensor can cooperate with the first detection member 211*a* of the storage column 210. Therefore, when the bucket 310 is located at the first position 900 corresponding to the storage column 210, the first distance measured by the first distance measurement sensor is the distance between the first detection member 211*a* and the bucket 310, that is, the first distance is the distance between the pushing plate 211 and the bucket 310. When the bucket 310 is located at the first position 900 corresponding to the storage column 210, the position of the second distance measurement sensor corresponds to the second preset position of the pushing plate 211 in the storage column 210, the second preset position is located on the item conveying path of the storage column 210, and the second detection member 211*b* is located at the second preset position of the pushing plate 211. Therefore, in a case of no item in the storage column 210, the space between the second detection member 211*b* and the second distance measurement sensor will not be blocked by the item in the storage column 210, and the second distance measurement sensor cooperates with the second detection member 211*b* in the storage column 210, that is, the second detection member 211*b* is the obstacle on the item conveying path closet to the bucket 310, that is, the target obstacle. Therefore, in the case where the bucket 310 is located at the first position 900 corresponding to the storage column 210, the second distance measured by the second distance measurement sensor is the distance between the second detection member 211*b* and the bucket 310, that is, the second distance is the distance between the pushing plate 211 and the bucket 310. In the case where there is an item in the storage column 210, the space between the second detection member 211*b* and the second distance measurement sensor will be blocked by the item in the storage column 210, and the second distance measurement sensor cooperates with the first item in the storage column 210, that is, the first item are the obstacle on the item conveying path closet to the bucket 310, that is, the target obstacle. Therefore, when the bucket 310 is located at the first position 900 corresponding to the storage column 210, the second distance measured by the second distance measurement sensor is the distance between the first item and the bucket 310.

Figure 5:
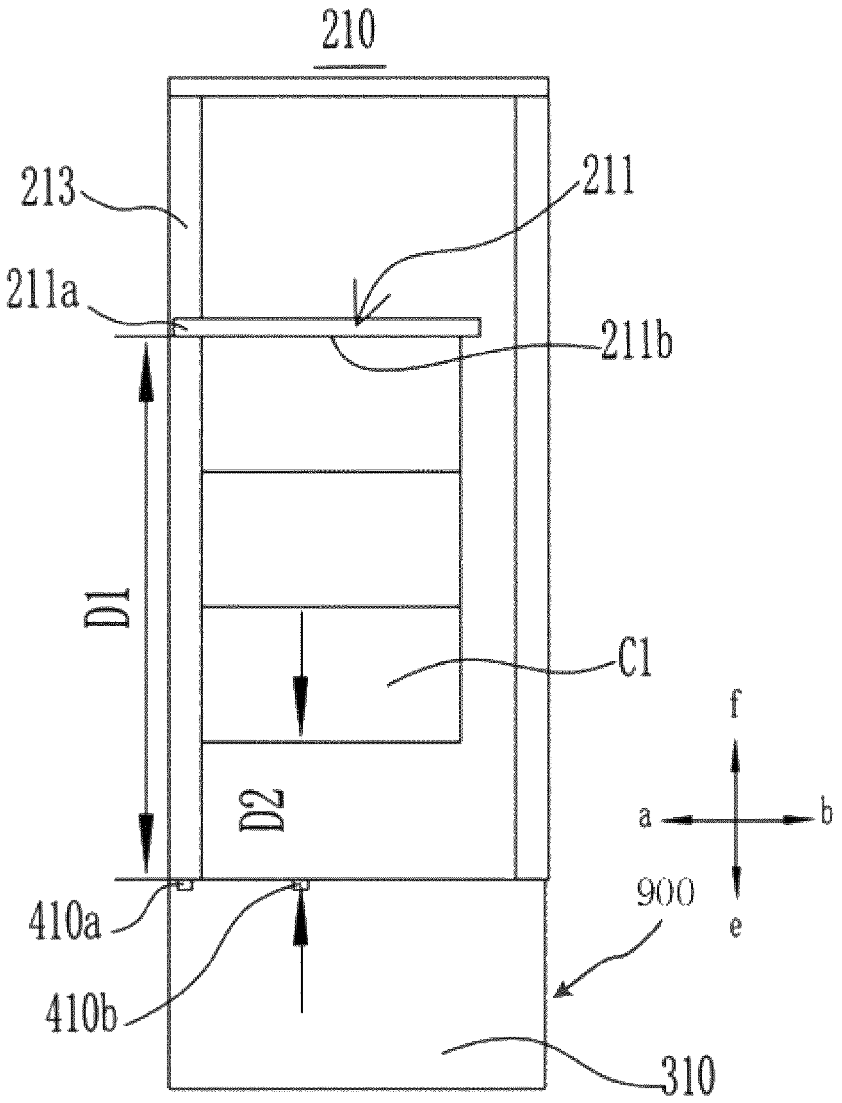
FIG. 5 is a schematic diagram illustrating the positional relationship between a storage column of a vending machine and the items accommodated in the storage column according to an embodiment of the present application.

FIG. 5 is a schematic diagram of a storage column 210 of a vending machine 010 and a positional relationship of items accommodated in the storage column 210 according to an embodiment of the present application. As illustrated in FIG. 5, the first distance measurement sensor 410*a* and the second distance measurement sensor 410*b* are located at the inlet of the bucket 310, since the first distance D1 is the distance between the pushing plate 211 of the storage column 210 and the bucket 310, in the case of no item in the storage column 210, the second distance D2 is the distance between the pushing plate 211 of the storage column 210 and the bucket 310, in the case where there is an item in the storage column 210, the second distance D2 is the distance between the first item in the storage column 210 and the bucket 310. Therefore, in the case of no item in the storage column 210, the first distance is equal to the second distance: and in the case of there is an item in the storage column 210, the first distance is not equal to the second distance, and the difference between the first distance and the second distance is the distance between the pushing plate 211 of the storage column 210 and the front surface of the first item Cl, that is, the difference between the first distance and the second distance is the total length of the items in the storage column 210. The control device 800 calculates, according to the total length of the items in the storage column 210 and the unit length of items in the storage column 210 pre-stored in the memory 500, the number of items in the storage column 210.

In the embodiment that the measuring device 400 includes the third distance measurement sensor fixed to the bucket 310, the control device 800 is configured to control the bucket 310 to move to the second position corresponding to the storage column 210 and control the third distance measurement sensor (not shown in the figure) to measure the first distance, and control the bucket 310 to move to the third position corresponding to the storage column 210 and control the third distance measurement sensor to measure the second distance.

In the case where the bucket 310 is located at the second position corresponding to the storage column 210, the third distance measurement sensor corresponds to the first preset position of the pushing plate 211 in the storage column 210, that is, the third distance measurement sensor cooperates with the first detection member 211*a*. The first preset position of the pushing plate 211 is disposed outside the item conveying path. In the case where the bucket 310 is located at the third position corresponding to the storage column 210, the third distance measurement sensor corresponds to the second preset position of the pushing plate 211 in the storage column 210, that is, the third distance measurement sensor cooperates with the target obstacle. The second preset position of the pushing plate 211 is located on the item conveying path.

In this embodiment, the control device 800 first controls the bucket driving mechanism 320 to drive the bucket 310 to the second position corresponding to the storage column 210, and controls the third distance measurement sensor to measure the first distance. In the case where the bucket 310 is located at the second position corresponding to the storage column 210, the position of the third distance measurement sensor corresponds to the first preset position of the pushing plate 211 in the storage column 210, the first preset position of the pushing plate 211 is disposed outside the item conveying path of the storage column 210, and the first detection member 211*a* is located at the first preset position of the pushing plate 211. Therefore, in the case where the bucket 310 is located at the second position corresponding to the storage column 210, the first distance measured by the third distance measurement sensor is the distance between the first detection member 211*a* and the bucket 310, that is, the first distance is the distance between the pushing plate 211 and the bucket 310. Then the control device 800 controls the bucket driving mechanism 320 to drive the bucket 310 to the third position corresponding to the storage column 210, and controls the third distance measurement sensor to measure the second distance. In the case where the bucket 310 is located at the third position corresponding to the storage column 210, the position of the third distance measurement sensor corresponds to the second preset position of the pushing plate 211 in the storage column 210, the second preset position is located on the item conveying path, and the second detection member 211*b* is located on the second preset position of the pushing plate 211. Therefore, in the case of no item in the storage column 210, the space between the second detection member 211*b* and the third distance measurement sensor will not be blocked by the item in the storage column 210, and the third distance measurement sensor cooperates with the second detection member 211*b* in the storage column 210, that is, the second detection member 211*b* is the obstacle on the item conveying path closet to the bucket 310, that is, the target obstacle. Therefore, in the case where the bucket 310 is located at the second position corresponding to the storage column 210, the second distance measured by the third distance measurement sensor is the distance between the second detection member 211*b* and the bucket 310, that is, the second distance is the distance between the pushing plate 211 and the bucket 310. In the case of there is an item in the storage column 210, the space between the second detection member 211*b* and the third distance measurement sensor will be blocked by the item in the storage column 210, and the third distance measurement sensor cooperates with the first item in the storage column 210, that is, the first item are the obstacle on the item conveying path closet to the bucket 310, that is, the target obstacle. Therefore, in the case where the bucket 310 is located at the third position corresponding to the storage column 210, the second distance measured by the third distance measurement sensor is the distance between the first item and the bucket 310.

On the basis of the above-mentioned two embodiments, the control device 800 is further configured to, before controlling the measuring device 400 to measure the first distance and/or the second distance, control the pushing plate 211 of the storage column 210 to push the item to be purchased by the user to the bucket 310 according to the item purchase instruction of the user.

In the embodiment that the measuring device 400 includes the first distance measurement sensor and the second distance measurement sensor, the control device 800 is configured to control the pushing plate 211 of the storage column 210 to push the item to be purchased by the user to the bucket 310 after the operation of controlling the bucket 310 to move to the first position 900 corresponding to the storage column 210 and before the operation of controlling the second distance measurement sensor to measure the second distance. In one embodiment, the control device 800 acquires the item purchase instruction input by the user through the human-computer interaction device 600 of the vending machine 010, or receives the item purchase instruction transmitted by the user through the handheld terminal through the communication device 700, and determines the storage column 210 (hereinafter referred to as the target storage column 210 for short) accommodating an item to be purchased by the user according to the item purchase instruction of the user. The control device 800 first controls the bucket driving mechanism 320 of the delivery device 300 to drive the bucket 310 to the first position 900 corresponding to the target storage column 210, then control the pushing plate driving mechanism 214 of the target storage column 210 to drive the pushing plate 211 to move from back to front such that the pushing plate 211 pushes the item to be purchased by the user to the bucket 310, and finally controls the measuring device 400 to measure the first distance and the second distance.

In the embodiment that the measuring device 400 includes the third distance measurement sensor, the control device 800 is further configured to control the pushing plate 211 of the storage column 210 to push the item to be purchased by the user to the bucket 310 after the operation of controlling the bucket 310 to move to the second position corresponding to the storage column 210 and before the operation of controlling the bucket 310 to move to the third position corresponding to the storage column 210. In one embodiment, after determining, according to the item purchase instruction of the user, the target storage column 210 accommodating an item to be purchased by the user, the control device 800 first controls the bucket driving mechanism 320 of the delivery device 300 to drive the bucket 310 to the second position corresponding to the target storage column 210, then control the pushing plate driving mechanism 214 of the target storage column 210 to drive the pushing plate 211 to move from back to front such that the pushing plate 211 pushes the item to be purchased by the user to the bucket 310, controls the measuring device 400 to measure the first distance, and next controls the bucket driving mechanism 320 to drive the bucket 310 to the third position corresponding to the target storage column 210) so as to measure the second distance.

The vending machine in the two embodiments can acquire the item purchase instruction of the user, determine the target storage column according to the item purchase instruction of the user, control the bucket to move to the position corresponding to the target storage column, control the pushing plate of the target storage column to push the item to be purchased by the user to the bucket, control the measuring device to measure the first distance and the second distance, finally calculate the difference between the first distance and the second distance, and determine the number of items in the target storage column based on the difference. The vending machine in the two embodiments can detect the number of items in the storage column after each dispensing of the storage column, thereby acquiring a quantity of remaining items in the storage column in time after the dispensing of the storage column, and improving timeliness of items quantity detection.

On the basis of the above-mentioned embodiments, the control device 800 is further configured to determine whether the difference between the first distance and the second distance is less than a first threshold, and determine that the items in the storage column 210 are sold out in response to determining that the difference between the first distance and the second distance is less than the first threshold. In one embodiment, the control device 800 can control the human-computer interaction device 600 or the communication device 700 of the vending machine 010 to transmit a first notification message that the items in the storage column 210 are sold out so as to remind the staff to replenish items. At the same time, the control device 800 records a state of the storage column 210 that the items are sold out so as to stop selling the items in the storage column 210 and avoid abnormal items selling due to continued attempts to ship the items from the storage column 210 when the items in the storage column 210 are sold out. In one embodiment, the first threshold is greater than zero and the first threshold is less than a unit length of items with a smallest length sold by the vending machine 010.

In one embodiment, the control device 800 is further configured to determine whether the number of items in the storage column 210 is less than the second threshold, and determine that the items in the storage column 210 are about to be sold out in response to determining that the number of items in the storage column 210 is less than the second threshold. The control device 800 can control the human-computer interaction device 600 or the communication device 700 of the vending machine 010 to transmit a second notification message that the items in the storage column 210 are about to be sold out so as to remind the staff to replenish the items.

In one embodiment, the vending machine 010 is applied to a vending system. The vending system includes a server and a plurality of vending machines 010 communicatively connected to the server. The communication device 700 may be configured to transmit a notification message that the items have been and/or are about to be sold out to the server.

In all, the vending machine of the embodiments of the present application can control the measuring device to measure the first distance and the second distance, calculate the difference between the first distance and the second distance, and calculate the number of items in the storage column based on the difference. The difference between the first distance and the second distance is calculated such that the total length of the items in the storage column can be accurately obtained, and the number of items in the storage column is accurately calculated according to the total length. Therefore, the vending machine of the embodiments of the present application improves the accuracy of the quantity detection of the items in the vending machine, and can effectively avoid the condition that the quantity detection of the items in the storage column existing in the vending machine of the related art is inaccurate.

What is claimed is:

1. A vending machine, comprising:

a control device;

a bucket;

a bucket driving mechanism, configured for driving the bucket into motion;

a storage column, configured to store items, wherein the storage column comprises a pushing plate and a pushing plate driving mechanism, and wherein the pushing plate driving mechanism is configured to drive the pushing plate to move on an item conveying path of the storage column thus pushing an item placed in the storage column out of the storage column from an outlet of the storage column in an item dispensing direction; and a measuring device, disposed on the bucket and configured to measure a distance between a target obstacle on the item conveying path and the bucket and a distance between the pushing plate and the bucket, the target obstacle being an obstacle nearest to the bucket on the item conveying path;

wherein the bucket driving mechanism, the pushing plate driving mechanism, and the measuring device are each electrically connected to the control device; and the control device is configured to control the measuring device to measure the distance between the pushing plate and the bucket in the item dispensing direction as a first distance, control the measuring device to measure the distance between the target obstacle and the bucket in the item dispensing direction as a second distance, calculate a difference between the first distance and the second distance, and calculate a number of items in the storage column based on the difference.

2. The vending machine of claim 1, wherein the measuring device comprises a first distance measurement sensor and a second distance measurement sensor; and the control device is configured to control the bucket to move to a first position corresponding to the storage column and control the first distance measurement sensor to measure the first distance and the second distance measurement sensor to measure the second distance, wherein when the bucket is located at the first position corresponding to the storage column, the first distance measurement sensor cooperates with a first detection member of the pushing plate in the storage column, the second distance measurement sensor cooperates with the target obstacle in the storage column, and wherein the first detection member of the pushing plate is disposed outside the item conveying path.

3. The vending machine of claim 2 wherein the pushing plate is provided with a second detection member disposed on the item conveying path, wherein in a case of no item in the storage column, the target obstacle is the second detection member.

4. The vending machine of claim 3, wherein the second detection member is disposed at a lower end of the pushing plate.

5. The vending machine of claim 2, wherein the storage column comprises a support plate configured for supporting the items and partition plates oppositely disposed on two sides of the support plate, wherein the partition plates and the support plate jointly define an item accommodation space of the storage column, and wherein the first detection member is disposed above the partition plates or at an upper end of the pushing plate.

6. The vending machine of claim 2, wherein the control device is further configured to control the pushing plate to push an item to be purchased by a user to the bucket after the operation of controlling the bucket to move to the first position corresponding to the storage column and before the operation of controlling the second distance measurement sensor to measure the second distance.

7. The vending machine of claim 1, wherein the control device is further configured to determine whether the difference between the first distance and the second distance is less than a first threshold, and determine that the items in the storage column have been sold out in response to determining that the difference is less than the first threshold.

8. The vending machine of claim 1, wherein the control device is further configured to determine whether the number of items in the storage column is less than a second threshold, and determine that the items in the storage column are about to be sold out in response to determining that the number of items in the storage column is less than the second threshold.

9. The vending machine of claim 2, wherein the control device is further configured to determine whether the difference between the first distance and the second distance is less than a first threshold, and determine that the items in the storage column have been sold out in response to determining that the difference is less than the first threshold.

10. The vending machine of claim 2, wherein the control device is further configured to determine whether the number of items in the storage column is less than a second threshold, and determine that the items in the storage column are about to be sold out in response to determining that the number of items in the storage column is less than the second threshold.

* * * * *